(12) United States Patent
Ko

(10) Patent No.: US 6,332,479 B1
(45) Date of Patent: Dec. 25, 2001

(54) FLEXIBLE BUNDLE FOR BINDING THE CABLES

(76) Inventor: Fu-Chung Ko, P.O. Box 697, Feng-Yuan City 420 (TW)

( * ) Notice: Subject to any disclaimer, the term of this patent is extended or adjusted under 35 U.S.C. 154(b) by 0 days.

(21) Appl. No.: 09/816,716

(22) Filed: Mar. 20, 2001

(51) Int. Cl.[7] .................................. F16L 9/00; H02G 3/04
(52) U.S. Cl. ..................... 138/156; 138/108; 138/151; 174/68.3
(58) Field of Search ................................ 138/156, 108, 138/151, 110; 174/68.3, 101, 72 C

(56) References Cited

U.S. PATENT DOCUMENTS

| | | | |
|---|---|---|---|
| 3,786,171 | * 1/1974 | Shira | 138/108 X |
| 4,602,124 | * 7/1986 | Santucci | 174/101 |
| 5,235,136 | * 8/1993 | Santucci et al. | 174/68.3 |

* cited by examiner

*Primary Examiner*—Patrick Brinson

(57) ABSTRACT

A flexible bundle for binding the cables includes an elongate flexible bundle having a pair of arcuate covering plates projected upward from the lateral side of the bottom and having their upper portions overlapped each other for a certain extent, a plurality of cables disposed into the bundle and a double faced tape attached to the underside of the bottom along the length thereof and including a peeling off paper attached to the outer surface of the tape. The flexible bundle is rolled up on a roller and can cut into a desired length at the working site.

1 Claim, 4 Drawing Sheets

FLEXIBLE BUNDLE FOR BINDING THE CABLES

BACKGROUND OF THE INVENTION

The present invention relates to cable binding technique and more particularly to a flexible bundle for binding the cables which bundle is structurally simple can be more effectively to bind the cables.

Typical bundle for binding the cables (as shown in FIGS. 1 and 2) comprises a lower portion 91, an upper portion 93 combined together to form a space therebetween to receive the cables 97. The lower portion 91 has a pair of male coupling plates 91 projected upward from two lateral sides and the upper portion 93 has a pair of female coupling plate 94 projected downward from the lateral sides so that they can be combined together in snap fitting. A glue layer 95 which may be double faced tape attaches to the bottom of the lower portion 91 and a peeling off paper 96 covers the outside of the glue 95. When peels off the paper 96, the bundle can be attached to a ground or flat surface. This type of bundle has at least several disadvantages set forth as follows:

a) if the male coupling plates 92 combining with the female coupling plates 94 is too loose, it will be break away on a kicking force and if the male coupling plates 92 combining with the female coupling plates 94 is two tight, it is difficult to dispose an additional cable 97 into the bundle, b) the bundle is made of rigid plastic material which is very breakable to step upon. Once the upper portion 93 or the lower portion 91 is broken, it is very difficult to change a new one, c) each of the above bundle has a certain length and can not bend over at a corner of a wall, but cut off to make a L-shape so as to expose a clearance, d) a bundle can receive a certain member of the cables, if adds additional cable it must change a large sized bundle that is very inconvenient, e) the manufacturing of the above bundle should use large sized mould which costs more, and f) the outlook of the above bundle is too dull to be decorated.

SUMMARY OF THE PRESENT INVENTION

The present invention has a main object to provide a flexible bundle for binding the cables which is structurally simple and is made of flexible material so as to be bended over at a corner of a wall.

Another object of the present invention is to provide a flexible bundle for binding the cables which has an arcuate top enabling the bundle against a kick of a stepping upon.

Still another object of the present invention is to provide a flexible bundle for binding the cables which can bind more cables without changing a large sized one.

Further object of the present invention is to provide a flexible bundle for binding the cables which bundle has a nice outlook and is readily to produce at a low cost.

The present invention will become more fully understood by reference to the following detailed description thereof when read in conjunction with the attached drawings.

DETAILED DESCRIPTION OF THE PREFERRED EMBODIMENT

Figure 1:
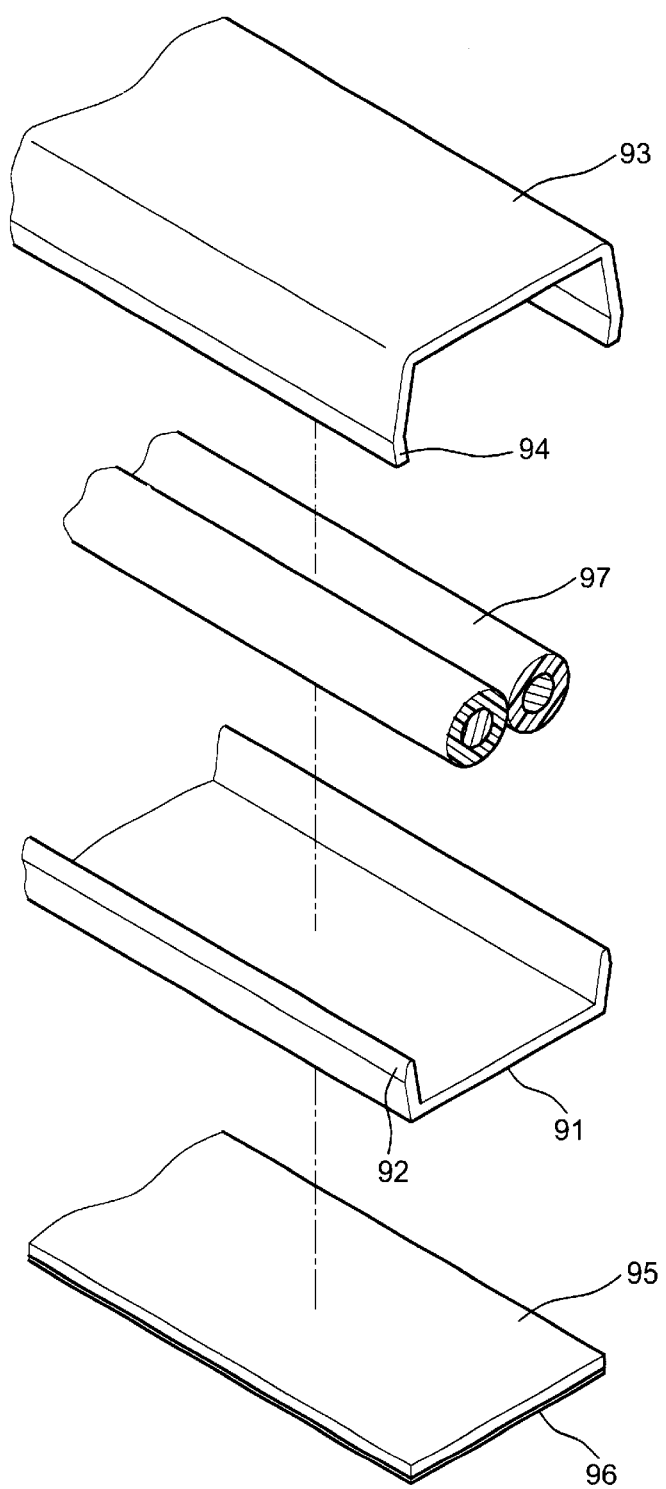
FIG. 1 is an exploded perspective view of a bundle according to a prior art.
Figure 2:
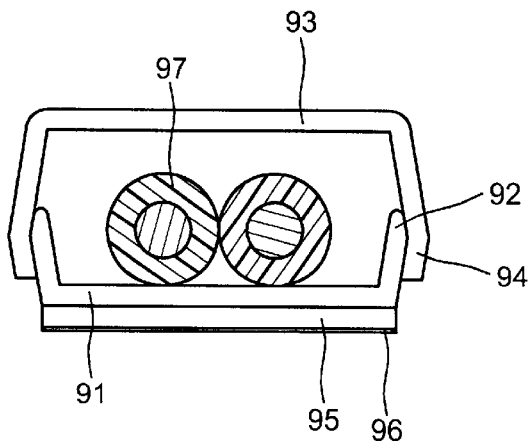
FIG. 2 is a sectional view to show the assembly of FIG. 1.
Figure 3:
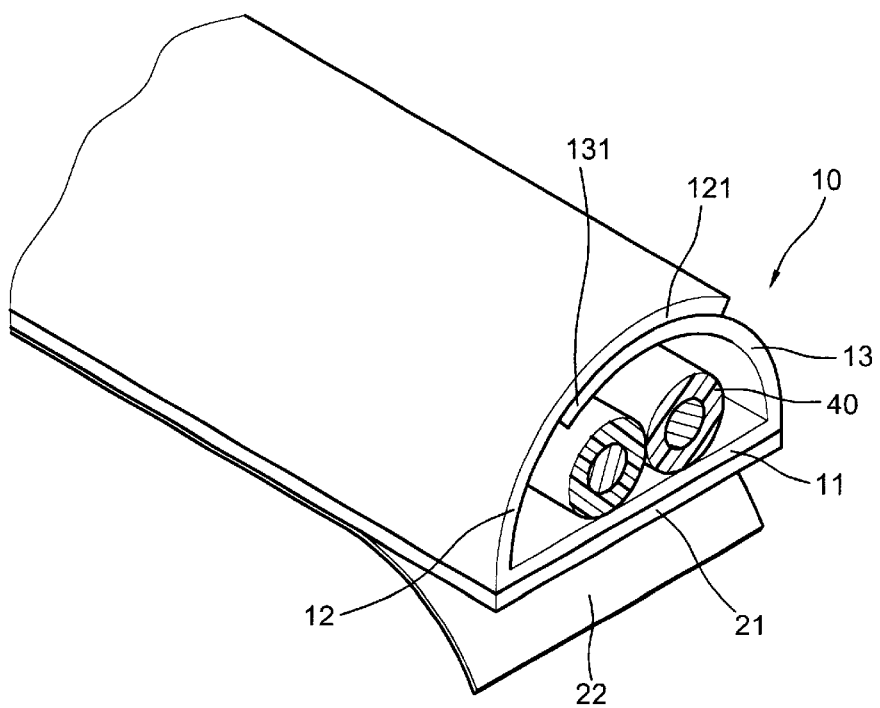
FIG. 3 is a perspective view to show the bundle of the preferred embodiment according to the present invention.
Figure 4:
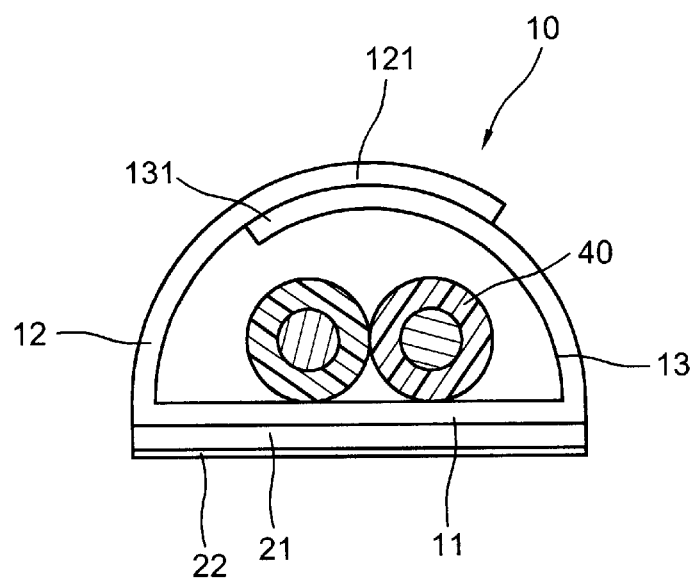
FIG. 4 is a sectional view to show the assembly of FIG. 4.

With reference to FIGS. 3 and 4 of the drawings, the flexible bundle for binding the cables of the present invention comprises an elongate flexible bundle 10 including a flat straight bottom 11, a pair of arcuate covering plates 12 and 13 projected upward from the lateral sides of the bottom 11 having their upper portion 121 and 131 overlapped each other for a certain extent to prevent the external object or dust to enter into the bundle 10 and the upper portions 121 and 131 can be opened by a tool such as the screw driver at any overlapping part, a plurality of cables 40 receivable into the bundle 10, a glue or double faced tape 21 attached to the under side of the flat straight bottom 11 and covered with a piece of peeling off paper 22.

Figure 5:
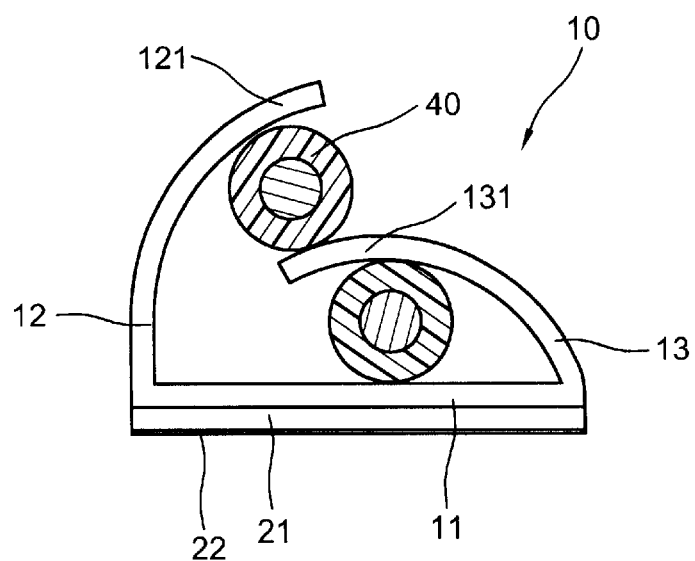
FIG. 5 is a sectional view of FIG. 4 to show the engagement of the cables into the bundle.

Referring to FIG. 5, when disposes the cables 40 into the flexible bundle 10, uses a screwdriver (not shown) inserted into the overlapped portions 121 and 131 and presses the lower overlapped portion 131 downward to make a gap to permit the cables 40 squeezing into the bundle 10 on one by one basis. The user simultaneously drags the cable 40 that the cables 40 smoothly enter into the bundle 10. Due to the flexibility of the bundle 10, the user does not have to use great strength and the bundle 10 enables to lay on an uneven surface or to bend at a corner of wall without cutting off.

The structure of the arcuate overlapping portions 121 and 131 can endure any external force such that when a kick or a step upon on it, the force will be separated into X and Y direction and the overlapping portions 121 and 131 will retreat a little to diminish the pressure because of its flexibility, thus the bundle 10 will not be broken but restores to its original condition after the pressure is removed.

The double faced tape 21 on the back of the bundle 10 enables it attaching to the ground or a vertical surface without moving away. It is very easy to do to strip the peeling off paper to expose the glue surface which will be firmly fixed the bundle 10 to the surface of ground or of a wall.

Figure 6:
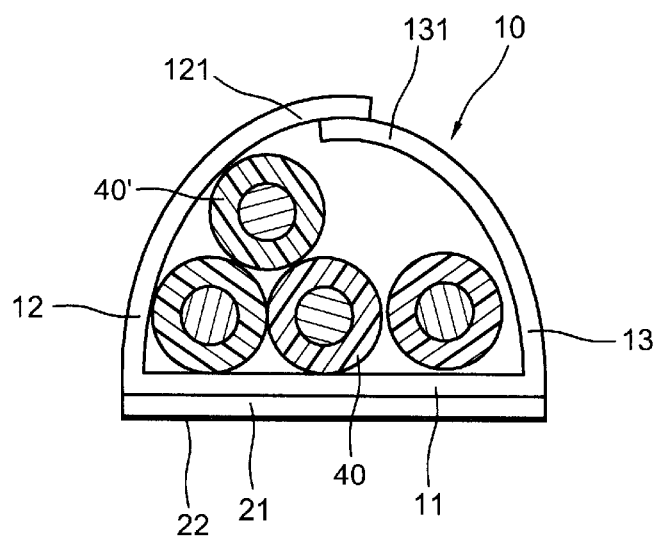
FIG. 6 is a sectional view to show the addition of cables being disposed into the bundle.

Referring to FIG. 6, if additional cable 40' disposes into the bundle 10, the user just do the process as decribed the above. However, the bundle 10 is expanded and the overlapping portions 121 and 131 becomes narrowed without damaging the bundle 10 itself.

Figure 7:
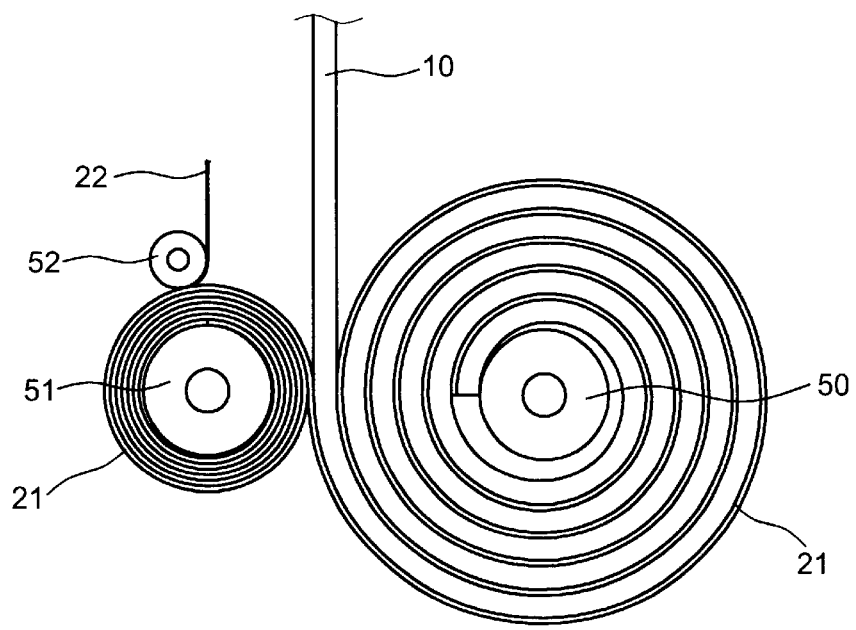
FIG. 7 is a side view to show the process to make the flexible bundle of the present invention.

Referring to FIG. 7, a process for manufacturing the bundle 10 is shown, first mounts the elongate bundle 10 on a first roller 50 and mounts the double faced tape 21 to a second roller 51 and then uses a third roller 52 disposed beside the roll of the double faced tape 21 to strip off the peeling off paper 22 on the inside surface of the tape 21. After the inside peeling off paper 22 is striped by the roller 52, the tape 21 is attached on the underside of the bundle. Finally operates the rollers 50, 51 and 52 simultaneously, a roll of the finished bundle 10 is therefore accomplished. The exact length of the bundle 10 is decided by the user who may cut it into desired length on the working site.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A flexible bundle for binding the cables comprising: an elongate bundle made of flexible material having a flat straight bottom, a pair of arcuate covering plates projected upward from lateral sides of the bottom having their upper portions overlapped each other for a certain extent, said bundle being rolled up on a roller;

a plurality of cables disposed into the bundle along the length thereof;

a piece of adhesive attached to underside of the bottom of the bundle along the length thereof;

a piece of peeling off paper attached to the outer surface of the adhesive along the length thereof.

* * * * *